(12) United States Patent
Smigelski

(10) Patent No.: US 7,480,977 B2
(45) Date of Patent: Jan. 27, 2009

(54) METHOD OF REPLACING SLOT ARMOR AND SLOT LINERS IN A GENERATOR ROTOR

(75) Inventor: Paul Michael Smigelski, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/639,244

(22) Filed: Dec. 15, 2006

(65) Prior Publication Data

US 2007/0085439 A1    Apr. 19, 2007

Related U.S. Application Data

(62) Division of application No. 10/957,719, filed on Oct. 5, 2004, now abandoned.

(51) Int. Cl.
*H02K 15/09* (2006.01)

(52) U.S. Cl. .................. 29/598; 29/401.1; 310/215

(58) Field of Classification Search ........... 29/596–598, 29/401.1, 732–737; 310/42, 61, 215
See application file for complete search history.

(56) References Cited

U.S. PATENT DOCUMENTS

| 4,015,050 | A | * | 3/1977 | Birchall et al. ............... 428/480 |
| 4,582,749 | A | | 4/1986 | Boulter et al. |
| 4,667,125 | A | | 5/1987 | Kaminski et al. |
| 4,709,181 | A | * | 11/1987 | Derderian .................... 310/214 |
| 4,859,891 | A | | 8/1989 | Jenkins et al. |
| 5,329,197 | A | | 7/1994 | Kudlacik |
| 5,421,077 | A | | 6/1995 | Zayechek et al. |
| 6,998,753 | B2 | * | 2/2006 | Irwin et al. .................. 310/215 |
| 2006/0071570 | A1 | * | 4/2006 | Smigelski .................... 310/214 |

* cited by examiner

*Primary Examiner*—Minh Trinh
(74) *Attorney, Agent, or Firm*—Nixon & Vanderhye, P.C.

(57) ABSTRACT

A method of replacing slot armor and slot liners in radial slots of generator rotors comprising: (a) removing a winding from respective radial slots in the generator rotor; (b) removing existing slot armors and slot liners from each of the radial slots in the generator rotor; (c) installing a pair of L-shaped slot armor components in each radial slot, each L-shaped armor component constructed of a powder-coated metal; and (d) installing a winding in the radial slots, wherein the L-shaped slot armor components substantially fill any space between the winding and adjacent walls of the radial slots.

6 Claims, 2 Drawing Sheets

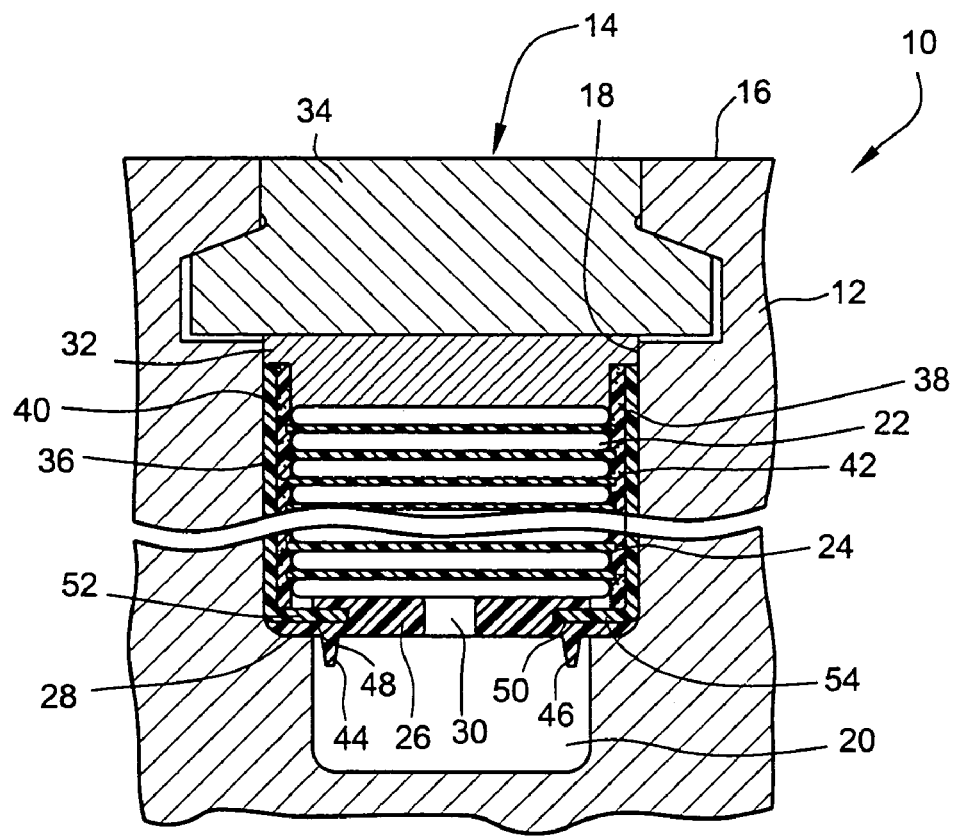
Fig. 1
(PRIOR ART)
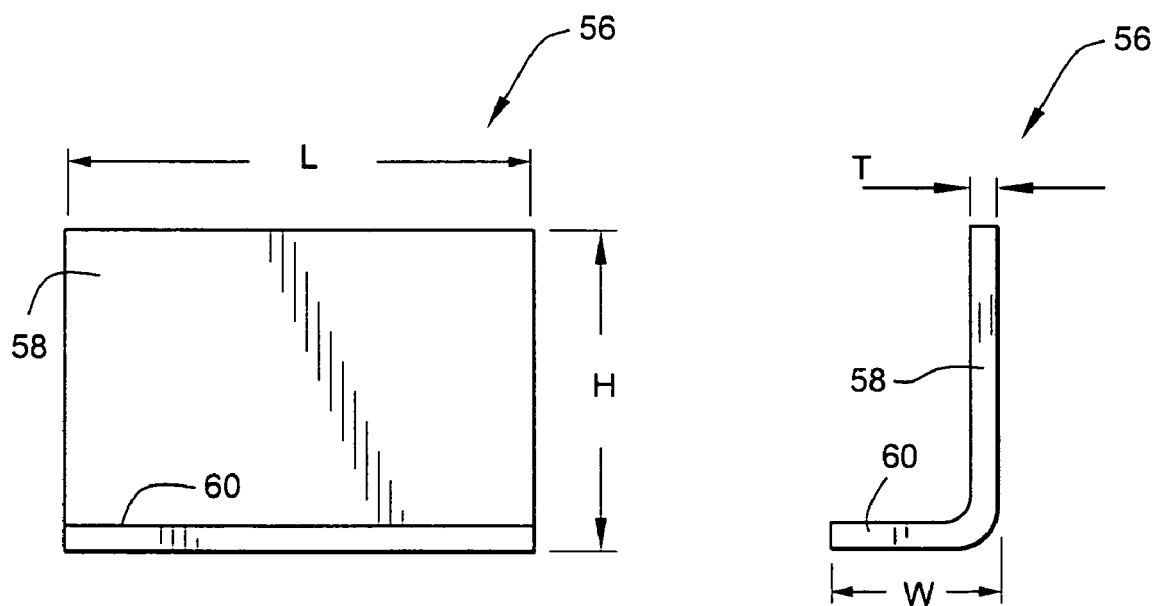
Fig. 2  Fig. 3

METHOD OF REPLACING SLOT ARMOR AND SLOT LINERS IN A GENERATOR ROTOR

This application is a division of application Ser. No. 10/957,719, filed Oct. 5, 2004 now abandoned, the entire content of which is hereby incorporated by reference in this application.

BACKGROUND OF THE INVENTION

This invention relates to electrical insulation or slot armor located between copper winding and radial slot walls in the body of a generator rotor.

When retrofitting or rewinding medium-sized generator rotors, older insulation, such as relatively thick asbestos, is removed from the radial slots in the generator rotor. When new and relatively thinner insulation, or slot armor, is added during the rewind process, additional space remains between the insulation and the walls of the radial slots. Typically, this additional space has been filled with metal slot liners glued into position within the radial slots so that the new slot armor and the slot liners substantially completely fill the space previously occupied by the old relatively thick insulation. Not only is this a time consuming and labor intensive effort, but the relatively rigid non-metallic slot armor is often broken during the assembly process.

BRIEF DESCRIPTION OF THE INVENTION

In an exemplary embodiment of this invention, the metal slot liner and the relatively thin non-metallic insulation or slot armor are replaced by a single piece slot armor in the form of powder-coated metal. Thus, there is no need for gluing metal slot liners into the slot, and no need for the somewhat delicate rigid, non-metallic insulation or slot armor.

In an exemplary embodiment, the new slot armor is comprised of a pair of L-shaped pieces of powder coated, insulated metal. The thickness, length, height and width of the slot armor is determined by the generator design and, specifically, by the amount of space between the winding and the radial slot walls created by the removal of the old insulation, and/or the removal of the current slot liner and non-metallic side wall insulation, or slot armor.

Thus, in one aspect, the present invention relates to slot armor for a generator rotor comprising a pair of L-shaped components each having height, width and thickness dimensions determined by a space between a field winding and an adjacent wall of a radial slot in the rotor, the L-shaped components constructed of a powder-coated metal.

In another aspect, the present invention relates to a rotor for a dynamoelectric machine, including a plurality of longitudinal slots therein extending radially into the rotor; a plurality of conductors in each of the slots; substantially L-shaped slot armor components extending radially along respective first and second sides of the slot between the slot and the plurality of conductors, wherein each of the components comprises a powder-coated metal.

In still another aspect, the invention relates to method of replacing slot armor and slot liners in radial slots of generator rotors comprising (a) removing a winding from respective radial slots in the generator rotor; (b) removing existing slot armors and slot liners from each of the radial slots in the generator rotor; (c) installing a pair of L-shaped slot armor components in each radial slot, each L-shaped armor component constructed of a powder-coated metal; and (d) installing a winding in the radial slots, wherein the L-shaped slot armor components substantially fill any space between the winding and adjacent walls of the radial slots.

The invention will now be described in detail in connection with the drawings identified below.

BRIEF DESCRIPTION OF THE DRAWINGS

FIG. 1 is a partial axial cross-sectional view of a rotor including a conventional insulation system utilizing non-metallic slot armor and metal slot liners; and FIG. 2 is a side elevation of an L-shaped armor component in accordance with an exemplary embodiment of the invention;

FIG. 3 is an end elevation of the L-shaped armor shown in FIG. 2; and

DETAILED DESCRIPTION OF THE INVENTION

Figure 4:
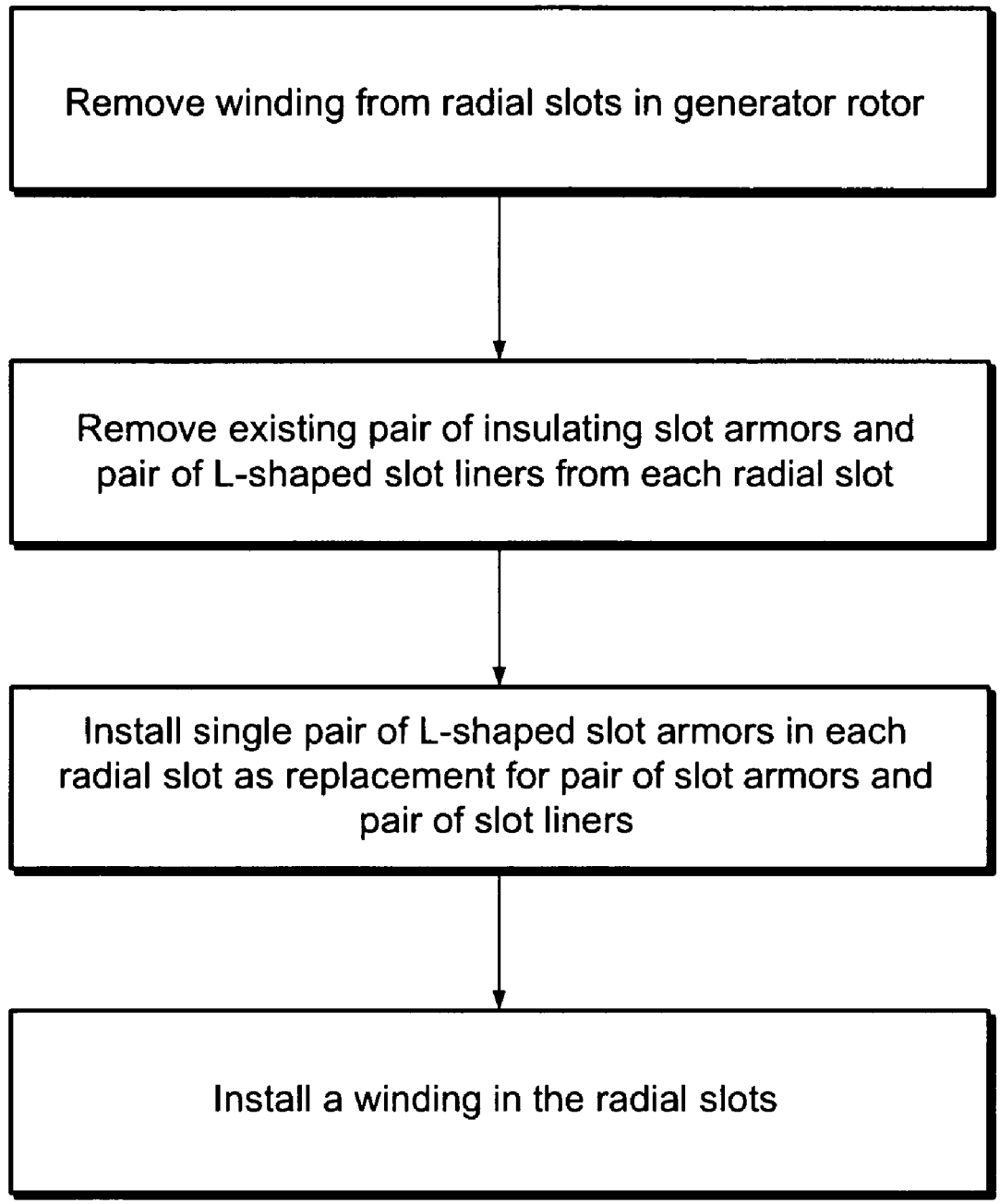
FIG. 4 is a schematic representation of replacing slot armor and slot lines in accordance with an exemplary embodiment of the invention.

Referring to FIG. 1, a rotor 10 of a known dynamo-electric machine includes a rotor forging 12 (only part of which is shown) including a plurality of radial slots 14 (one of which is shown) disposed therein, typically extending the length of the rotor forging. For reference, the peripheral outer surface of the rotor forging 12 is shown at 16.

Slot 14 includes a main slot portion 18 and a subslot portion 20. Conventionally, the width dimension of the subslot portion 20 is less than that of main slot portion 18. A plurality of conductors 22, mutually insulated by intermediate insulating layers 24, are disposed in the main slot portion 18. A subslot cover 26 rests on a shoulder 28 defined by the different widths of main slot portion 18 and subslot portion 20. A coolant opening 30 is disposed generally centered in subslot cover 26. A flow of a coolant gas in subslot 20 passes through coolant opening 30 and travels through conventional coolant openings (not shown) in conductors 22, insulating layers 24, creepage block 32 and dovetail wedge 34 toward peripheral outer surface 16. Air or hydrogen is usually used as a coolant gas.

In a typical retrofit, when older and relatively thicker insulation is replaced, metal slot liners such as the slot liner halves 36, 38 are glued into position within the main slot portion 18 to occupy some of the space previously occupied by the old insulation. Non-metallic insulation (or slot armors) 40, 42 is assembled in the main slot portion 18 to fill the remaining space between the conductors 22 and the slot liners 36, 38.

Subslot cover 26 may include legs 44 and 46 to prevent electrical creepage from the bottom conductor of conductors 22 to the sides of slot 14. In addition, subslot cover 26 may include first and second edge slots 48 and 50. Edge slot 48 receives an end of a right-angle portion 52 of slot liner half 36. Similarly, edge slot 50 receives an end of right-angle portion 54 of slot liner half 38.

Slot armors 40, 42 are either rigid or non-rigid. Rigid types of slot armor include a fiber matrix in a cured resin binder. Non-rigid types include, for example, a non-woven paper-like polyamid material sold under the trademark Nomex®.

In accordance with an exemplary embodiment of the invention, and with reference also to FIG. 4. the metal slot liners 36, 38 and the non-metallic insulation or slot armors 40, 42 are replaced by single slot armor components. Specifically, a pair of L-shaped slot armor components, one of which is shown at 56 in FIGS. 2 and 3, are formed of any appropriate metal material, for example, stainless steel or other suitable alloy, with a powder-coat insulation applied over all surfaces of the components. One suitable powder coat composition is sold under the trade name PCR Insulation. Each armor component 56 includes an elongated side wall 58 and a shorter bottom wall 60. The dimensions of the L-shaped armors 56 are determined by the generator design as well as the space between the winding or conductors 22 and the walls of the radial slot 14. In a retrofit situation, that space is created by the removal of old, relatively thick insulation. Thus, the slot armor dimensions may vary for specific applications. For example, the length dimension L of the armor element may vary between 70 and 80 inches up to 200 inches or more. The height H may vary from 4 or 5 inches up to 8 inches or more, and the width W may vary from about ½ inch to an inch. The thickness of the armor may vary between, for example, 50 and 60 mils.

Thus, the space between the winding or conductors 22 and the walls of the main slot portion 18 will be filled by single L-shaped armor components 56 on each side of the main slot portion 18, and since the armor components are custom designed to fill the entire space, the typical practice of utilizing a metal slot liner and non-metallic slot armor can be eliminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of replacing slot armor and slot liners in radial slots of generator rotors, wherein each radial slot has a pair of non-metallic insulating slot armors and a pair of L-shaped metal slot liners therein, comprising:
    (a) removing a winding from respective radial slots in the generator rotor;
    (b) removing existing pair of non-metallic insulating slot armors and pair of L-shaped metal slot liners from each of the radial slots in the generator rotor;
    (c) installing a single pair of L-shaped slot armor components in each radial slot as replacements for said pair of slot armors and pair of slot liners, each L-shaped armor component constructed of a powder-coated metal; and
    (d) installing a winding in the radial slots, wherein the L-shaped slot armor components are sized to substantially fill any space between the winding and adjacent walls of the radial slots created by the removal of the pair of slot armors and pair of slot liners from each radial slot.

2. The method of claim 1 wherein said L-shaped components are constructed of stainless steel.

3. The method of claim 1 wherein said L-shaped components have a length dimension of between 70 and 200 inches.

4. The method of claim 1 wherein said L-shaped components have a width dimension of from ½ to 1 inch.

5. The method of claim 1 wherein said L-shaped components have a height dimension of from about 4 to about 8 inches.

6. The method of claim 1 wherein said L-shaped components have a thickness of between 50 and 60 mils.

* * * * *